United States Patent [19]
Ichikawa

[11] Patent Number: 6,018,788
[45] Date of Patent: Jan. 25, 2000

[54] DATA ACCESS CONTROL FOR DISK SYSTEM USING A LIMIT VALUE AND COUNT VALUE TO OPTIMIZE SEQUENTIAL AND REPEAT ACCESS

[75] Inventor: Yasuhiko Ichikawa, Tokyo, Japan

[73] Assignee: Kabushiki Kaisha Toshiba, Kawasaki, Japan

[21] Appl. No.: 08/925,333

[22] Filed: Sep. 8, 1997

[30] Foreign Application Priority Data

Mar. 26, 1997 [JP] Japan ................................ 9/073430

[51] Int. Cl.⁷ .................................................. G06F 12/08
[52] U.S. Cl. ........................................ 711/113; 711/137
[58] Field of Search ................................ 710/52, 53, 56; 711/113, 133, 134, 137, 159

[56] References Cited

U.S. PATENT DOCUMENTS

| | | | |
|---|---|---|---|
| 4,494,157 | 1/1985 | Ina et al. ................................... | 360/48 |
| 5,150,472 | 9/1992 | Blank et al. .............................. | 711/137 |
| 5,276,662 | 1/1994 | Shaver, Jr. et al. ...................... | 369/32 |
| 5,577,224 | 11/1996 | DeWitt et al. .......................... | 711/118 |
| 5,623,608 | 4/1997 | Ng ............................................ | 711/137 |
| 5,727,232 | 3/1998 | Iida et al. ................................. | 710/56 |
| 5,758,191 | 5/1998 | Kasebayashi et al. ................... | 710/56 |

FOREIGN PATENT DOCUMENTS

| | | | |
|---|---|---|---|
| 7-334426 | 12/1995 | Japan .............................. | G06F 12/08 |
| 8-137754 | 5/1996 | Japan .............................. | G06F 12/08 |

*Primary Examiner*—Eddie P. Chan
*Assistant Examiner*—Gary J. Portka
*Attorney, Agent, or Firm*—Pillsbury Madison & Sutro LLP

[57] ABSTRACT

A disk controller (HDC) reads requested data from a disk in accordance with a read command from a host system, and stores the data in a buffer memory. The HDC reads successive data, together with the requested data, and stores the data in the buffer memory. When a repeat access request is issued from the host system, the HDC temporarily stops disk access which has been continued. A CPU determines the amount of data stored in the buffer memory by disk access on the basis of a limit value set in a limit register. The HDC reads requested data corresponding to the repeat access request from the buffer memory and transfers the data to the host system.

4 Claims, 6 Drawing Sheets

DATA ACCESS CONTROL FOR DISK SYSTEM USING A LIMIT VALUE AND COUNT VALUE TO OPTIMIZE SEQUENTIAL AND REPEAT ACCESS

BACKGROUND OF THE INVENTION

The present invention relates to a data access control system for use in a disk drive including a buffer memory for storing data read from a disk and data to be written in the disk, and having a function of performing data transfer control between the disk and a host system through the buffer memory.

In a disk drive such as a hard disk drive (HDD), when an access command (read or write command) is issued from a host system (e.g., a personal computer), the CPU moves a head to a target position on the disk to read the requested data (the data accessed by the host system) from the target position or write data at the target position. The target position is a target track having a track number (cylinder number) which is a physical address corresponding to a logical address contained in a command from the host system. Note that a physical address includes a head number and a data sector number as well as a track number.

Consider an operation associated with a read command, in particular. The requested data (read data decoded into write data) read from the disk is stored in a buffer memory which is generally constituted by a RAM (Random Access Memory). Control on this buffer memory and data transfer control between the disk and the host system are executed by a disk controller (HDC). When data is read from the disk and stored in the buffer memory by a predetermined data amount, the HDC executes data transfer from the buffer memory to the host system. The HDD executes data transfer in units of data sectors.

In this system, much time is required between the instant at which the host system issues a read command and the instant at which the requested data is actually transferred from the disk drive. For this reason, in the HDD, in particular, when the host system requests access to data which has been previously read from the disk in accordance with an access request from the host system, the HDC reads the requested data from the buffer memory and transfers it to the host system. In this method, since the drive need not read the data from the disk, the processing time required for data transfer can be shortened to allow high-speed transfer of the requested data to the host system. Such a scheme is called a cache system. In the cache system, a state in which requested data is stored in the buffer memory is called a hit (cache hit).

The cache processing executed by the HDD cache system roughly includes processing for a sequential access request from the host system, and processing for a repeat access request. A sequential access request is a read access request for consecutive addresses. A repeat access request is a read access request for the same address.

As described above, the HDC stores the data read from the disk in accordance with an access request from the host system in the buffer memory. The HDC manages the data storage state (i.e., the amount of data that can be stored) of the buffer memory. If the buffer memory has no available area, and the data read from the disk cannot be stored therein, the HDC temporarily stops the read operation of data from the disk. When an area in which data can be stored (available area) is generated in the buffer memory, the HDC restarts the data read operation.

The HDC also manages data transfer between the host system and the buffer memory. More specifically, the HDC transfers the requested data stored in the buffer memory to the host system, and stops data transfer to the host system when there is no requested data to be transferred from the buffer memory. When the requested data read from the disk is stored in the buffer memory by a predetermined amount, the HDC restarts data transfer to the host system. In general, this predetermined amount is a data amount measured in data sectors, which is the minimum unit amount for a read access request.

Buffer memory management and data transfer control performed by the HDC in the HDD will be described below with reference to the block diagram of FIG. 6 and the flow chart of FIG. 7.

When a read command (read access request) is issued from a host system 200, the CPU (not shown) of an HDD 100 checks whether the read access request is a sequential access request, a repeat access request, or a normal access request (steps S31 and S32). In this case, an HDC 1 receives the read command from the host system 200, and sets it in a command register 1B (step S30). The CPU always monitors the command register 1B and recognizes the read command from the host system 200.

Assume that the read command from the host system 200 is a normal access request (NO in step S32). The HDC 1 accesses a buffer memory 2 to check whether the requested data accessed by the read command is stored in the buffer memory 2 (step S33). If the requested data is not stored in the buffer memory 2 (miss hit), the CPU executes control to seek a head to the target track on which the requested data is recorded, thereby executing a read operation of data from the disk. At this time, the CPU outputs an instruction to store the requested data (e.g., data 3A corresponding to two data sectors) read from the disk 3 and the successive data (e.g., the data corresponding to the remaining data sectors on the same track) having addresses consecutive to those of the requested data in the buffer memory 2 (step S34). The CPU also outputs an instruction to transfer the requested data to the host system 200 every time the requested data is stored in the buffer memory 2 by a predetermined amount.

The HDC 1 stores the requested data read from the disk 3 in an area 2A of the buffer memory 2, and also stores the successive data read from the disk 3 in a remaining available area 2B. In this case, the amount of data stored in the buffer memory 2 is managed by a buffer counter 1A. When a predetermined amount of requested data is stored in the area 2A of the buffer memory 2, the HDC 1 starts transferring the data to the host system 200 (step S35). At this time, the HDC 1 stores the successive data read from the disk 3 in the buffer memory 2 up to the limit of the available storage area (arrow V1), as shown in FIG. 6. When the HDC 1 transfers all the requested data to the host system 200, the CPU ends the read command from the host system 200 (YES in step S36).

When the HDC 1 transfers all the requested data from the buffer memory 2 to the host system 200 (arrow V2), the area 2A, of the buffer memory 2, which corresponds to the requested data becomes an available area. The HDC 1 therefore stores the successive data in the available area 2B of the buffer memory 2, and determines that permission is granted to read data following the successive data from the disk 3 and store the data in the available area 2A (arrow V3).

Assume that a read command as a sequential access request is issued from the host system 200 in this state (YES in step r31). That is, this command is an access request for data having an address consecutive to that of the requested data. The requested data corresponding to this sequential access request is the data that has already been stored in the available area 2B of the buffer memory 2, or the data that is being read from the disk 3 into the available area 2A. The CPU therefore need not perform a read operation of data from the disk 3, but gives the HDC 1 an instruction to start data transfer.

Upon reception of this instruction from the CPU, the HDC 1 starts transferring the data stored in the area 2B of the buffer memory 2 to the host system 200, or starts data transfer thereto when a predetermined amount of data is stored in the area 2A (step S35). When a read command as a sequential access request is issued again from the host system 200 afterward, the above operation is repeated (steps S31, S35, and S36).

Assume that a read command as a repeat access request is issued from the host system 200 (YES in step S32). That is, this command is an access request for requested data having the same address as that of requested data corresponding to the immediately preceding read command.

At this time, the requested data has been read from the disk 3 and stored in the area 2A of the buffer memory 2 upon processing associated with the immediately preceding read command. As described above, however, when the requested data in the area 2A of the buffer memory 2 is completely transferred to the host system 200 by the processing associated with the immediately preceding read command, the area 2A is recognized as an available area. For this reason, there is a possibility that data consecutive to the data stored in the area 2B has been read from the disk 3 and stored in the area 2A (i.e., an overwrite operation). That is, there is a possibility that the requested data corresponding to the repeat access request has been erased from the buffer memory 2.

Upon reception of a read command as a repeat access request, the CPU therefore gives the HDC 1 an instruction to immediately stop a read operation of data from the disk 3 (YES in step S32; step S37). After this processing, the HDC 1 transfers the requested data stored in the area 2A of the buffer memory 2 to the host system 200 (YES in step S38; step S35). If no request data is left in the area 2A of the buffer memory 2 in spite of the operation of stopping the data read operation, the CPU gives the HDC 1 an instruction to read data from the disk 3 (NO in step S38). In according to this instruction, the HDC 1 reads the requested data from the disk 3 and stores it in the buffer memory 2, and further reads successive data and stores it in the buffer memory 2 as long as the buffer memory 2 has an available area (step S34).

In such a conventional cache system, upon reception of a repeat access request from the host system, the CPU stops a read operation of data from the disk to minimize the possibility that the requested data stored in the buffer memory is overwritten and erased by successive data. This processing poses the following inconvenience.

The processing of reading data following requested data from the disk and storing it in the buffer memory allows cache processing to effectively function with respect to a sequential access request from the host system. If, therefore, a read operation of successive data from the disk is stopped, when a sequential access request is generated, no requested data is stored in the buffer memory. That is, a miss hit occurs. As a result, the HDC reads the requested data from the disk again and stores it in the buffer memory. The processing time required to transfer the requested data to the host system become inevitably longer than that when the requested data is stored in the buffer memory, i.e., a hit occurs.

As described above, when a repeat access request is generated, the disk access processing is immediately stopped. For this reason, the amount of consecutive data (successive data) read from the disk into the buffer memory varies in accordance with the intervals at which read commands as access requests are issued from the host system. More specifically, as the intervals at which command are issued from the host system shorten, the amount of successive data stored in the buffer memory decreases, and vice versa.

For this reason, as the command issuing intervals in the host system shortens, i.e., the processing speed in the host system increases, the amount of successive data stored in the buffer memory decreases. The hit rate with respect to sequential access requests from the host system, in particular, therefore decreases. As a result, the data access efficiency decreases.

BRIEF SUMMARY OF THE INVENTION

It is an object of the present invention to increase the hit rate with respect to read commands so as to realize high-speed data access for a host system by increasing the probability of storing requested data in a buffer memory when a repeat access request is issued from the host system, and also increasing the probability of storing successive data in the buffer memory.

In order to achieve the above object, according to the present invention, there is provided a system comprising: counter means for counting an amount of data read from a disk and stored in a buffer memory; limit register means for holding a limit value which represents the amount of data stored in the buffer memory and determines a timing at which a read operation of data from the disk is stopped; and control means for storing, in the buffer memory, data read from the disk in accordance with a data access request from the host system, and transferring the data to a host system.

The control means has a read limit function of stopping a read operation of data from the disk when the limit value is set in the limit register means, and the count value of the counter means coincides with the limit value.

In this system, when data corresponding to an access request is read from the disk and stored in the buffer memory, and successive data is read from the disk and stored in the buffer memory, the amount of successive data to be read can be limited by the limit value set in the limit register means.

More specifically, when a read command as a repeat access request is issued from the host system, the data read from the disk is stored in the buffer memory by a predetermined data amount on the basis of the limit value set in the limit register means by continuing the read operation of successive data from the disk without immediately stopping it. When, therefore, a sequential access request is issued from the host system afterward, the possibility that the requested data is stored in the buffer memory is high. For this reason, the probability of transferring the requested data from the buffer memory to the host system at high speed is high. Since the amount of data stored in the buffer memory is limited by the limit value, the probability that requested data corresponding to a repeat access request is stored in the buffer memory without being overwritten and erased by successive data increases. Therefore, the probability of transferring requested data corresponding to a repeat access request from the buffer memory to the host system at high speed increases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment in which the present invention is applied to an HDD will be described below with reference to the accompanying drawings.

Figure 1:
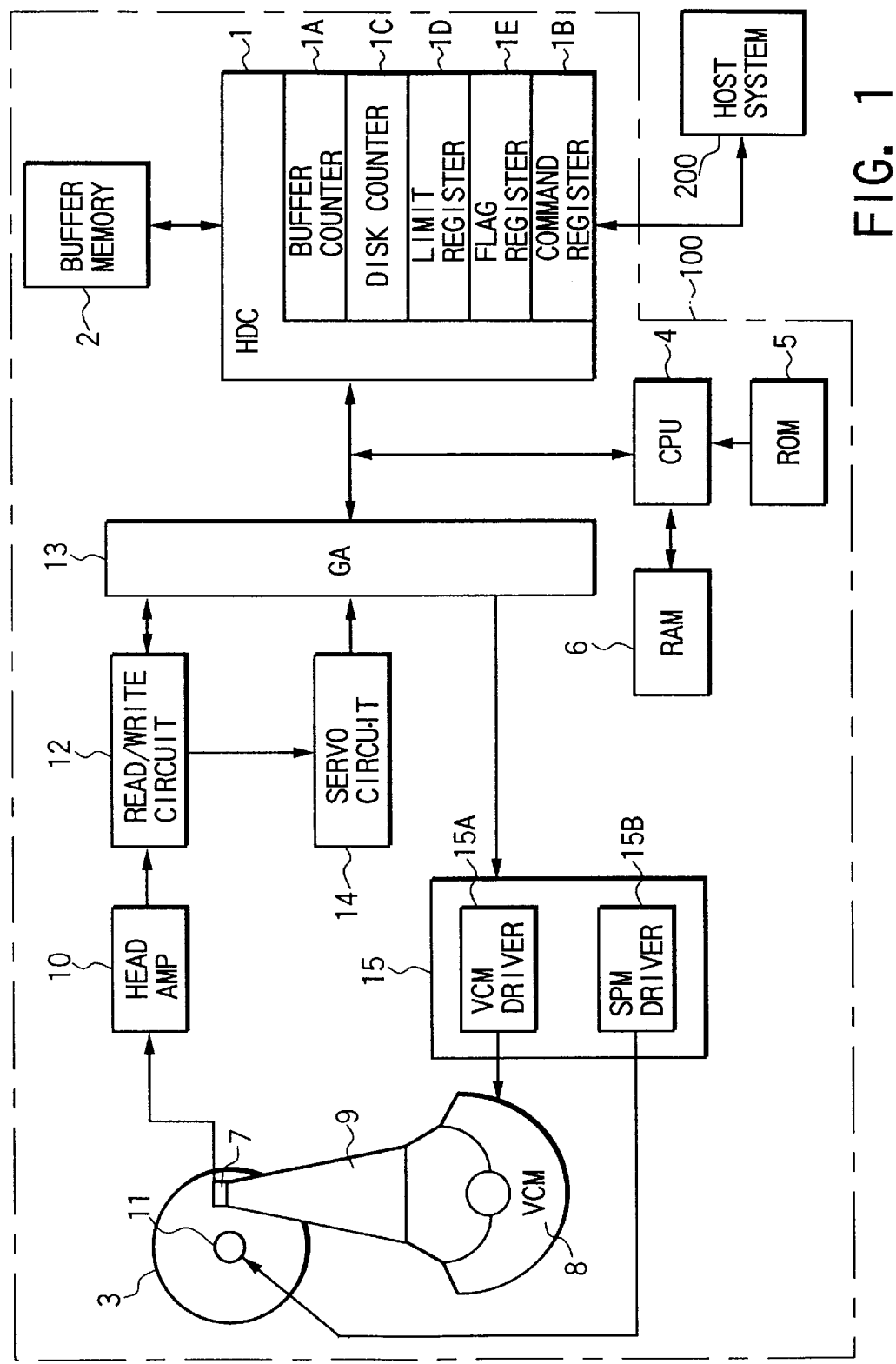
FIG. 1 is a block diagram showing the main part of a disk drive according to the present invention.

As shown in FIG. 1, an HDD 100 of this embodiment is connected to a host system 200 to input/output requested data in accordance with an access request from the host system 200. Note that the embodiment is related to processing associated with read commands as read access requests from the host system 200, but no description will be made for processing associated with write commands as write access requests.

The HDD 100 may be mounted either inside or outside the computer main body of the host system 200. The HDD 100 includes a disk as a storage medium, a head 7 for executing a read or write operation of data with respect to the disk 3, and a drive mechanism for the disk 3 and the head 7. The drive mechanism is roughly constituted by a spindle motor (SPM) 11 for rotating the disk 3 and a head actuator (carriage) 9.

One or a plurality of disks 3 are mounted on the spindle motor 11. Many tracks (cylinders) are concentrically formed on the upper and lower surfaces of the disk 3. Each track is divided into a plurality of (e.g., 50) tracks. The respective tracks have servo areas (servo sectors) at the same position in the radial direction. These servo areas are arranged at equal intervals in the circumferential direction by a predetermined number. A data sector is a data area on which user data (data requested by the host system 200) can be recorded in a data amount as a transfer unit. On each servo area, servo data for positioning the head 7 to a target track on the disk 3 is recorded in advance. Each servo data is constituted by a track address indicating a track number (cylinder number) for identifying a track and servo burst data as position data within the range of each track.

The head 7 is mounted on the head actuator 9. The head actuator 9 moves the head 7 in the radial direction of the disk 3 using the driving force generated by a voice coil motor (VCM) 8. The VCM 8 is driven upon reception of a driving current from a VCM driver 15A included in a motor driver 15. The VCM driver 15A outputs the driving current on the basis of the control operation amount determined by the head positioning control processing performed by a CPU (microprocessor) 4. A driving current is supplied from an SPM driver 15B included in the motor driver 15 to the spindle motor 11.

The HDD 100 includes elements roughly classified into signal processing system elements and control system elements, in addition to the drive mechanism elements. The signal processing system includes a head amplifier 10, a read/write circuit 12, and a servo circuit 14. The head amplifier 10 is generally mounted on a flexible printed circuit board. The head amplifier 10 includes read and write amplifiers for inputting/outputting read and write signals to/from the head 7. In this embodiment, the head amplifier 10 amplifies a read signal output from the head 7 by using the read amplifier and outputs the amplified signal to the read/write circuit 12.

The functions of the read/write circuit 12 are roughly classified into the decoding function of decoding a read signal read from the disk 3 by the head 7 into original write data, and the coding function of performing coding processing when write data is to be written in the disk 3. The read/write circuit 12 transfers the user data (data requested by the host system and successive data) read from the disk 3 to the HDC 1 through an interface control circuit (GA) 13. The read/write circuit 12 also executes signal processing for the servo data recorded on a servo area, and outputs the resultant data to the servo circuit 14.

The servo circuit 14 extracts the track number and the amplitude value of the servo burst data from the servo data subjected to signal processing in the read/write circuit 12 to generate a timing signal called a servo gate. The servo gate is a timing signal that becomes active only for the duration of a servo area. The track number and the servo burst data extracted by the servo circuit 14 are transferred to the CPU 4 through the GA 13.

The GA 13 is constituted by a gate array and has the functions of interfacing between the signal processing and the control system, generating/monitoring various types of timing signals, notifying the HDC 1 of the position of a data sector.

The CPU 4 executes various types of control processing for the HDD 100 in accordance with the control programs (FW) stored in a ROM 5. More specifically, the CPU 4 executes head positioning control on the basis of the servo data (the track number and the amplitude value of the servo burst data) extracted by the servo circuit 14 to move and position the head 7 to a target track on which requested data corresponding to an access request is recorded. In addition, the CPU 4 communicates with the HDC 1 to control data transfer between the disk 3 and a buffer memory 2 and data transfer between the buffer memory 2 and the host system 200. The CPU 4 can refer to the contents of the register and counter of the HDC 1 which are required for data transfer control. The CPU 4 stores various types of data required for data transfer control in a RAM 6, reads data therefrom, and uses them, as needed. In this embodiment, the CPU 4 stores, in the RAM 6, data such as a start address in the buffer memory 2 and a cache data amount when a repeat access request or a sequential access request is generated.

The HDC 1 is a main element of the present invention as well as the CPU 4. The HDC 1 roughly has a host interface function, a management function for the buffer memory 2, and a disk control function. The host interface function is the function of controlling communication of data and commands with the host system 200. The disk control function is the function of controlling the timing of data transfer from the disk 3. This function includes, as a function associated with this embodiment, the function of transferring data read from the disk 3 to the buffer memory 2.

The management function for the buffer memory 2 includes the function of temporarily stopping a data read operation to wait until an area of the buffer memory 2 becomes available when data read from the disk 3 is stored in the buffer memory 2 up to the limit. The management function also includes the function of restarting a data read operation when an area of the buffer memory 2 becomes available. This function includes, as a function associated with this embodiment, the function of stopping data transfer to the host system 200 to wait until requested data is stored in the buffer memory 2 when the data requested by the host system 200 is not stored in the buffer memory 2. The management function also includes the function of starting data transfer to the host system 200 when a predetermined amount of requested data (e.g., a data amount corresponding to one data sector) is stored in the buffer memory 2. As means for executing these functions, the HDC 1 includes a buffer counter (up/down counter) 1A for monitoring the amount of data stored in the buffer memory 2 and a command register 1B for holding a read command and the like from the host system 200.

The HDC 1 has the following new management function for cache control in addition to the management function for the buffer memory 2. As means for realizing this management function, the HDC 1 has a disk counter 1C, a limit register ID, and a flag register 1E. The disk counter 1C is an up counter which increments every time a read operation (disk access) of one-sector data from the disk 3 is complete. The limit register 1D is a register for holding a count limit value (indicating the limit value of the amount of data stored in the buffer memory 2) for setting the timing at which disk access is temporarily stopped or restarted. The flag register 1E is a register for holding a permission flag (flag PF) for designating permission to the function of temporarily stopping disk access on the basis of the count limit value set in the limit register 1D, or an inhibition flag (flag IF) for designating inhibition of this function. Setting and clearing operations for the disk counter 1C, the limit register 1D, and the flag register 1E are performed by the CPU 4. Note that the disk counter 1C is irrelevant to data transfer to the host system 200, unlike the buffer counter 1A.

Assume that the flag PF is set in the flag register 1E. In this case, when the count value of the disk counter 1C reaches the count limit value of the limit register 1D, the HDC 1 temporarily stops disk access regardless of the capacity of the buffer memory 2. When the flag IF is set in the flag register 1E, the HDC 1 continues disk access until the buffer memory 2 has no available area regardless of the count limit value set in the limit register 1D even if the count value of the disk counter 1C coincides with the count limit value. Assume that disk access is temporarily stopped. In this case, when the flag IF is set in the flag register 1E, the HDC 1 restarts disk access.

(Read Command Processing)

Read command processing in the HDD 100 of this embodiment will be described mainly with reference to FIGS. 2 to 4B.

When a read command for a read access request is issued from the host system 200, the HDC 1 receives the read command and sets it in the command register 1B (step S1). The CPU 4 refers to the command register 1B, recognizes the contents of the read command, and starts command processing.

Assume that this read command is neither a sequential access request nor a repeat access request, but is a normal access request (NO in step S2; NO in step S3). The CPU 4 checks, on the basis of the cache hit address stored in, e.g., the RAM 6, whether the requested data corresponding to the command is stored in the buffer memory 2 (step S4). If it is determined that the requested data is stored in the buffer memory 2 (a hit is made), the HDC 1 reads the requested data from the buffer memory 2 and transfers it to the host system 200 in accordance with the instruction from the CPU 4 (YES in step S4; step S9).

If it is determined that the requested data is not stored in the buffer memory 2 (a miss hit is made), the CPU 4 executes the above head positioning control processing to move the head 7 to perform a read operation of data (disk access operation) from the disk 3. The HDC 1 stores the requested data, read from the disk 3, in the buffer memory 2, and stores successive data having an address consecutive to that of the requested data in the buffer memory 2 in accordance with an instruction from the CPU 4 (step S6). The CPU 4 outputs an instruction to transfer the requested data to the host system 200 every time the requested data is stored in the buffer memory 2 by a predetermined amount (corresponding to one data sector) (step S7).

The CPU 4 clears the disk counter 1C and the limit register 1D of the HDC 1 (step S5). The CPU 4 sets the flag IF (limit inhibition flag) in the flag register 1E. In accordance with this flag IF, the HDC 1 neglects the count limit value set in the limit register 1D.

Figure 2:
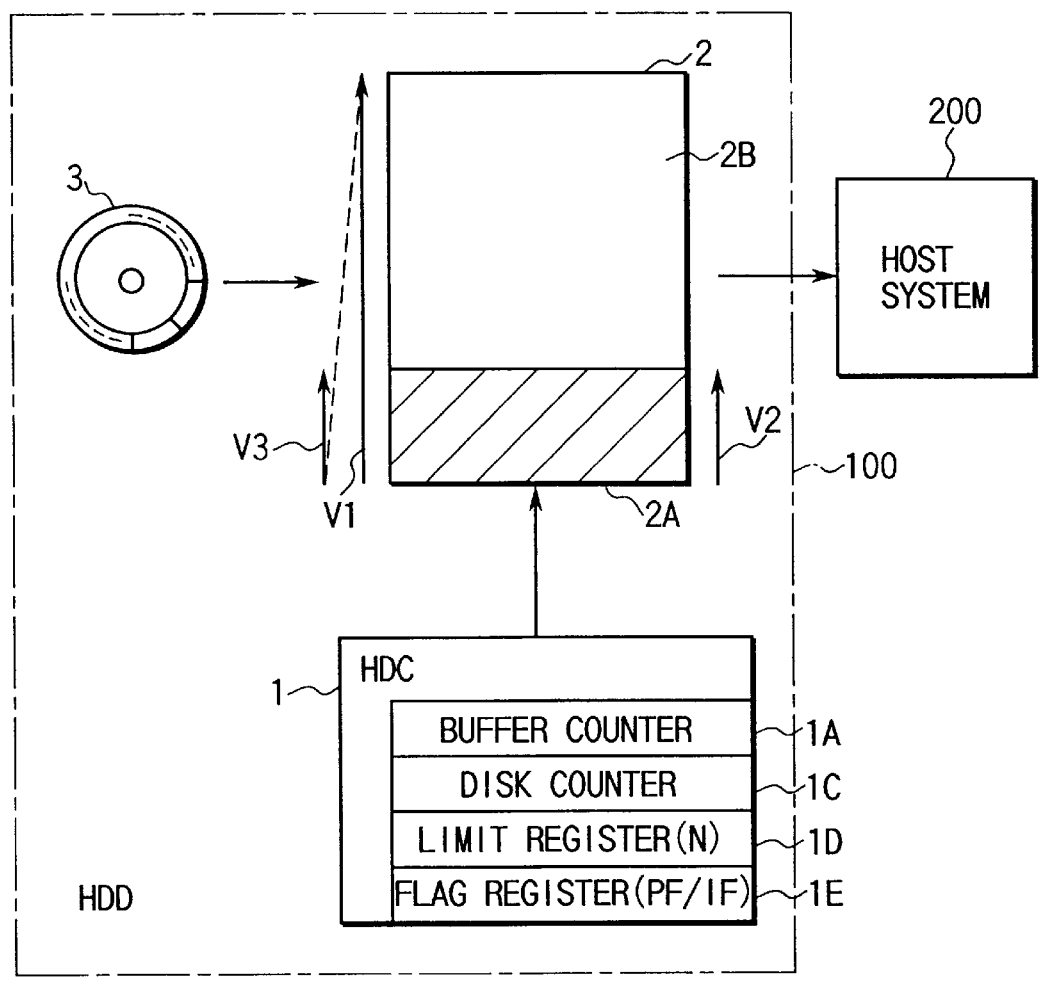
FIG. 2 is a block diagram for explaining control operations performed by a CPU and an HDC according to the present invention.
Figure 3:
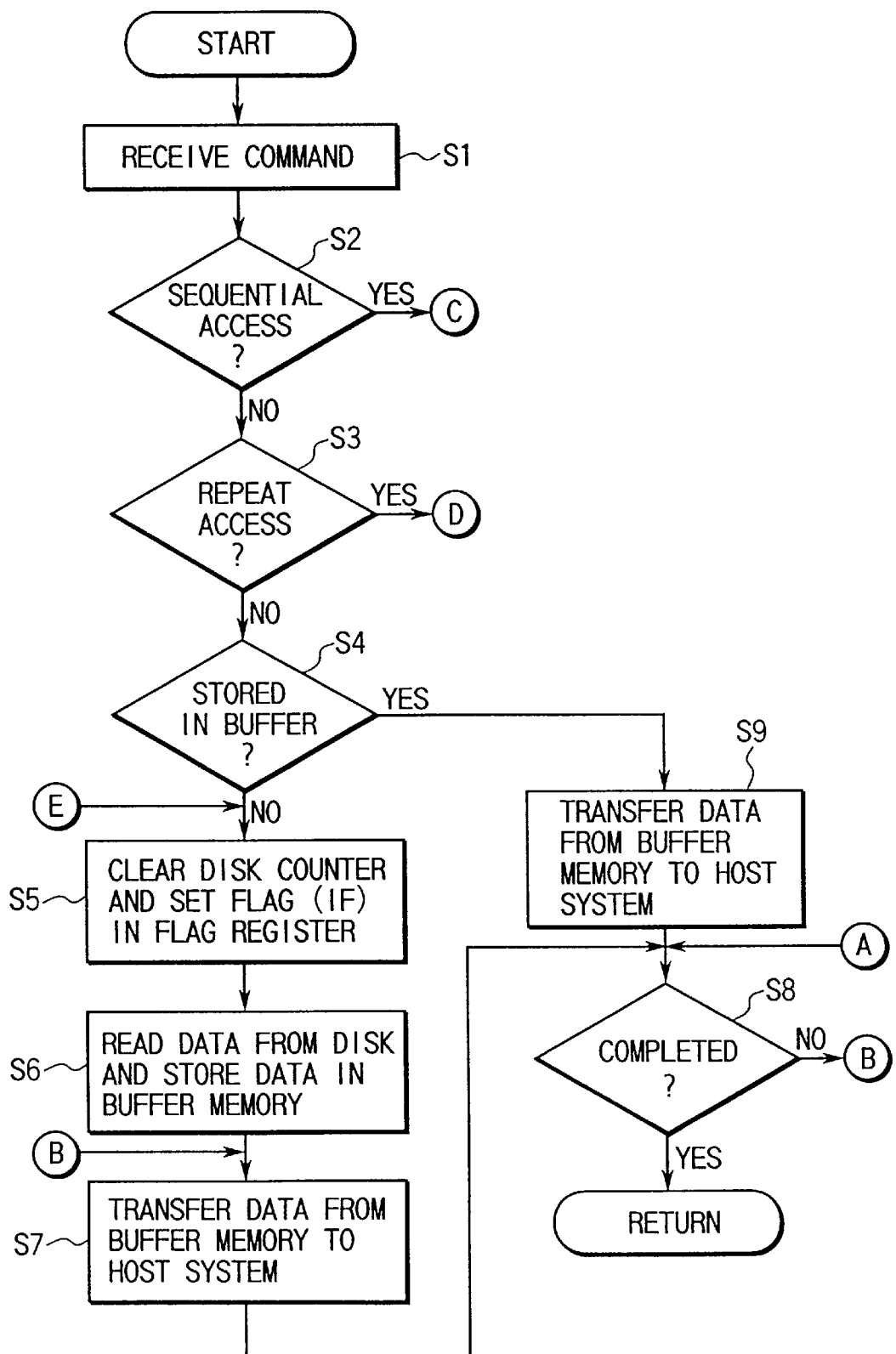
FIGS. 3, 4A and 4B are flow charts for explaining the control operations performed by the CPU and HDC according to the present invention.
Figures 4A, 4B:
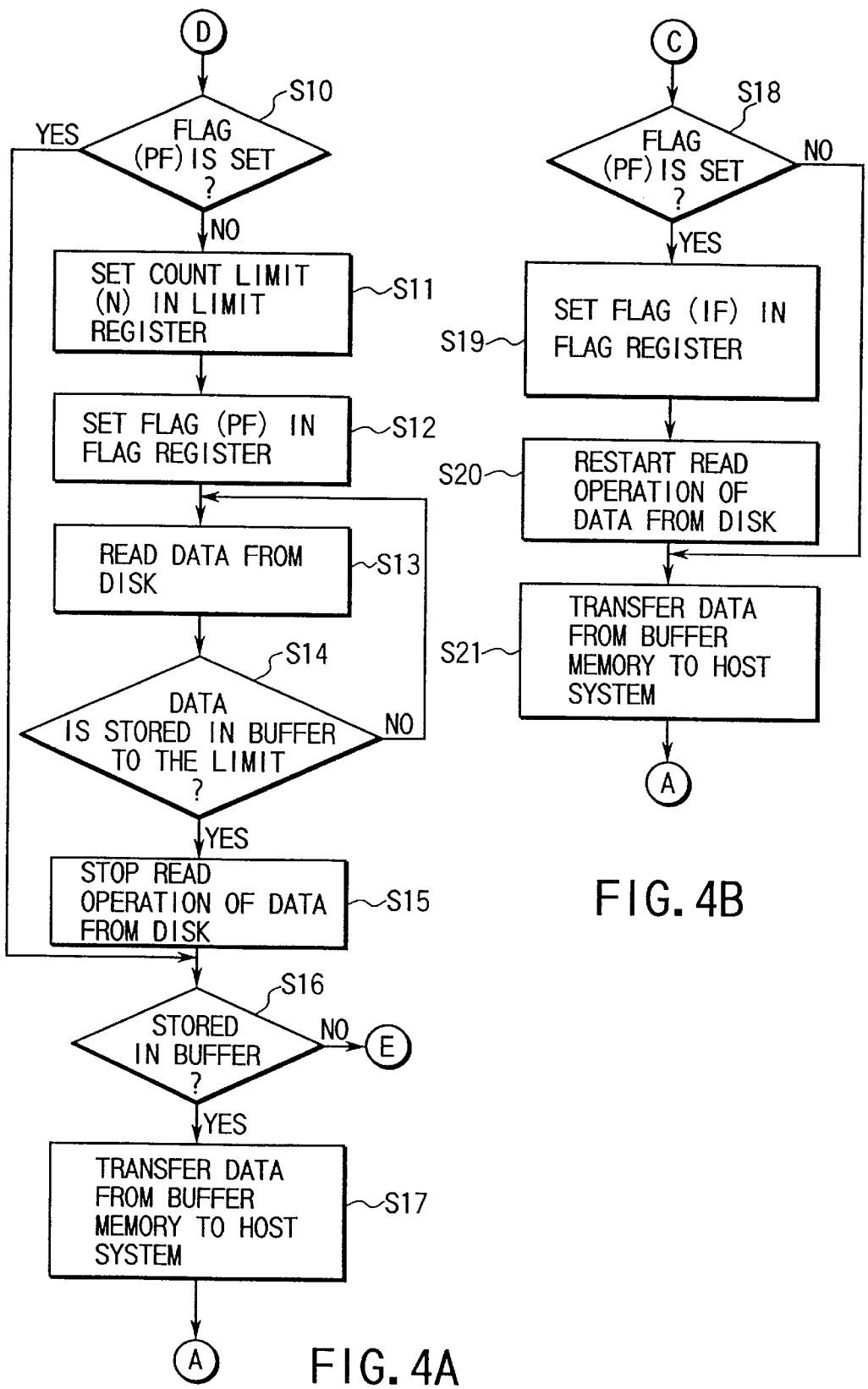

As described above, in addition to the requested data, the HDC 1 reads the successive data from the disk 3 and stores it in the buffer memory 2. In this case, as shown in FIG. 2, the HDC 1 stores the requested data in an area 2A of the buffer memory 2, and stores the successive data in an available area 2B of the buffer memory 2 to capacity (arrow V1).

When the HDC 1 transfers all the requested data from the area 2A of the buffer memory 2 to the host system 200, the CPU 4 ends read command processing (YES in step S8).

When the HDC 1 transfers all the requested data from the buffer memory 2 to the host system 200 (arrow V2), the area 2A, of the buffer memory 2, which corresponds to the requested data becomes an available area. For this reason, upon storing the successive data in the available area 2B of the buffer memory 2, the HDC 1 determines that permission is granted to further read successive data from the disk 3 and store it in the area 2A (arrow V3).

Assume that a read command as a repeat access request is issued from the host system 200 in this state (NO in step S2; YES in step S3). That is, an access request is issued for requested data having the same address as that corresponding to the immediately preceding read command.

As described above, when this read command as a repeat access request is issued, the requested data has been transferred from the area 2A of the buffer memory 2 to the host system 200. By the time the transfer of the requested data is complete, the HDC 1 will have recognized the area 2A of the buffer memory 2 as an available area and received permission to read successive data consecutive to the data stored in the available area 2B from the disk 3 and store it in the area 2A. For this reason, when data following the requested data is stored in the available area 2B, and data following the data stored in the available area 2B is stored in the area 2A, the requested data which has been stored in the area 2A may be overwritten and erased.

When, therefore, a repeat access request is issued, the CPU 4 therefore executes the following processing to temporarily stop disk access so as to ensure the requested data stored in the area 2A of the buffer memory 2. More specifically, when a repeat access request is issued, the CPU 4 refers to the flag register 1E to check whether the flag PE (limit permission flag) is set (step S10). In this case, as described above, the flag IF (limit inhibition flag) is set in the flag register 1E (NO in step S10).

Figure 5A:
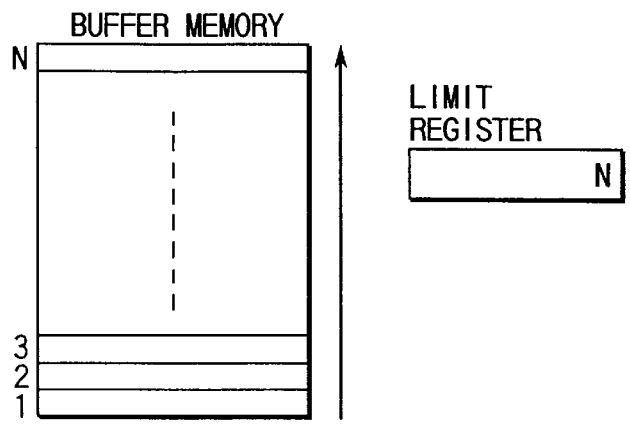
FIGS. 5A and 5B are block diagrams showing the operation of a buffer memory according to the present invention.
Figure 5B:
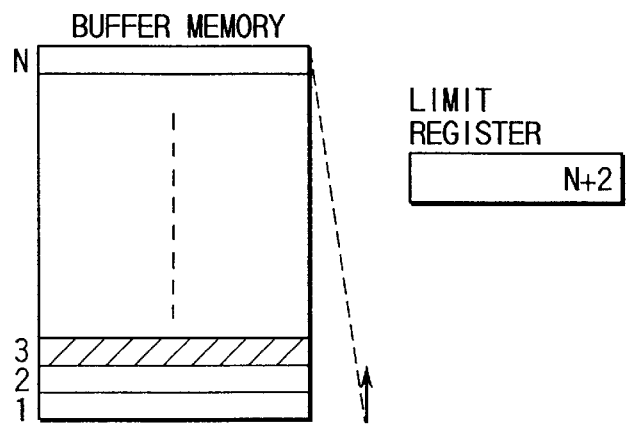
Figure 6:
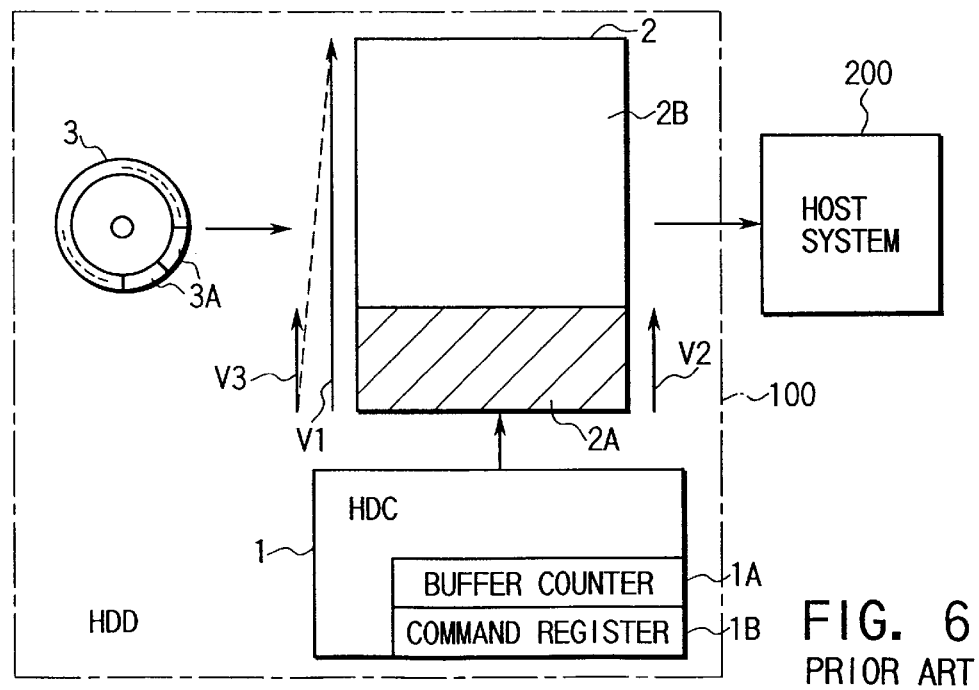
FIG. 6 is a block diagram for explaining a control operation performed by a conventional HDC.
Figure 7:
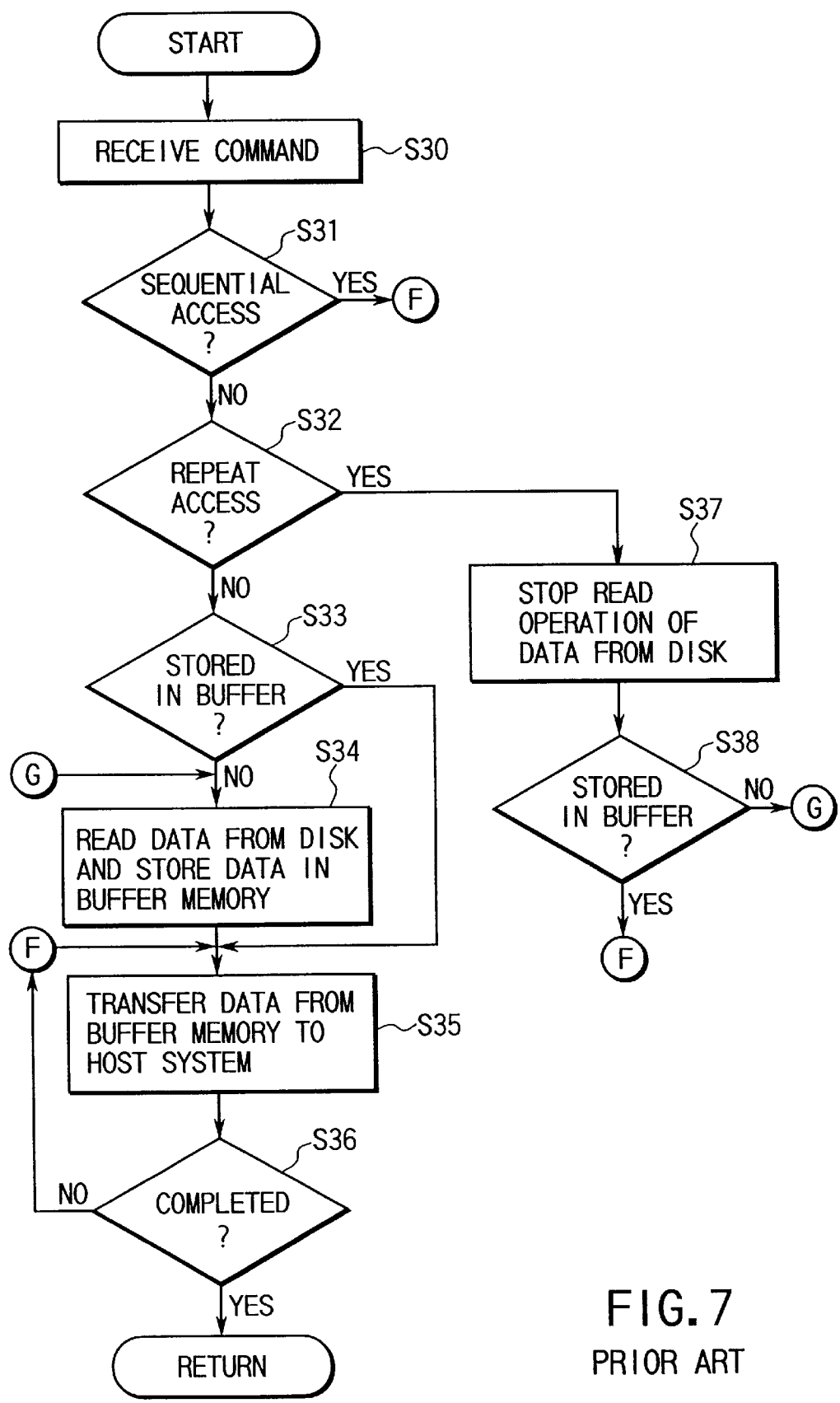
FIG. 7 is a flow chart for explaining the control operation performed by the conventional HDC.

The CPU 4 sets a count limit value (N) in the limit register 1D, and sets the flag PE in the flag register 1E (steps S11 and S12). In this case, the count limit value (N) is the value (the data amount measured in data sectors) obtained by adding the size of the available area 2B to the size (data storage capacity) of the area 2A of the buffer memory 2. That is, as shown in FIG. 5A, the count limit value (N) corresponds to the data amount of N sectors of the buffer memory 2. In this case, as shown in FIG. 5B, for example, the count limit value (N+2) corresponds to the value obtained by adding the data amount of two sectors as overwrite data to the data amount of N sectors.

Note that the disk counter 1C of the HDC 1 increments every time data (in units of sectors) read from the disk 3 is stored in the buffer memory 2 after the disk counter 1C is cleared by the processing in step S5. The HDC 1 continues disk access from the disk 3 to the buffer memory 2 while comparing the count limit value (N) of the limit register 1D with the count value of the disk counter 1C (step S13). When the count limit value (N) coincides with the count value of the disk counter 1C, the HDC 1 temporarily stops disk access (YES in step S14; step S15).

More specifically, in this embodiment, the HDC 1 temporarily stops disk access on the basis of the count limit value (N) set in the limit register 1D when the successive data is read from the disk 3 and stored in the available area 2B after the requested data is stored in the area 2A of the buffer memory 2. Even if, therefore, the transfer of the requested data in the area 2A to the host system 200 is complete in accordance with the immediately preceding command, when a repeat access request is generated, no successive data is stored in the area 2A. In other words, when a repeat access request is generated, disk access is stopped, and the requested data stored in the area 2A is retained unlike a normal case in which when the transfer of the requested data in the area 2A is complete, the area 2A is treated as an available area. When, therefore, a repeat access request is generated, the HDC 1 transfers the same requested data as that read from the disk 3 in accordance with the immediately preceding command from the area 2A to the host system 200 in accordance with an instruction from the CPU 4 (YES in step S16; step S17).

As described above, in this embodiment, when a repeat access request is generated, disk access is temporarily stopped after disk access is executed up to the limit capacity (area 2A+area 2B) of the buffer memory 2 on the basis of the count limit value (N) set in the limit register 1D. Therefore, before the requested data in the area 2A is overwritten by successive data by continuous disk access, the requested data can be transferred as the requested data corresponding to the repeat access request to the host system 200. Apparently, however, if the requested data in the area 2A of the buffer memory 2 is overwritten and erased by the successive data by continuous disk access before the count limit value (N) and the flag PF are set when a repeat access request is generated, the CPU 4 executes a read operation of data from the disk 3 (NO in step S16; steps S5 and S6).

Even in a state in which disk access is stopped, when a count limit value (N) is set, data from the disk 3 can be stored in the buffer memory 2 to capacity. When, therefore, a read command is issued from the host system 200 afterward, the possibility of hitting the requested data in the buffer memory 2 is high. That is, since the requested data corresponding to an access request is hit without fail within the range of the area 2A or 2b of the buffer memory 2, the cache hit rate does not decrease much.

Assume that a read command as a sequential access request is issued from the host system 200 while disk access is stopped as in the above case (YES in step S2). That is, this read command is an access request for data having an address consecutive to that of the requested data corresponding to the immediately preceding command.

More specifically, when a command as a sequential access request is generated, the CPU 4 refers to the flag register 1E to check whether the flag PF (limit permission flag) is set (step S1B). In this case, as described above, the flag PF (limit permission flag) is set in the flag register 1E (YES in step S18).

The CPU 4 sets the flag IF (limit inhibition flag) in the flag register 1E (step S19). With this operation, the HDC 1 cancels the temporarily stopped state of disk access and automatically restarts a read operation of data from the disk 3 (step S20). That is, the HDC 1 continues the read operation of data from the disk 3 until the buffer memory 2 has no available area. In this case, since the requested data corresponding to the sequential access request is stored in the available area 2B of the buffer memory 2, the CPU 4 gives the HDC 1 an instruction to perform data transfer to the host system 200 (step S21).

As described above, in this embodiment, the temporarily stopped state of disk access which is set when a repeat access request is generated can be canceled by only operating the limit register 1D and the flag register 1E. Therefore, the HDC 1 can automatically restart disk access to read data from the disk until the buffer memory 2 has no available area.

In the above embodiment, the present invention is applied to the HDD. However, the present invention can be applied to disk storage systems other than the HDD, e.g., a magnetooptical disk drive, as long as the systems are designed to perform data transfer by using buffer memories.

As has been described above, according to the present invention, in a system designed to increase the cache hit rate with respect to sequential access requests by continuing disk access to read successive data, in addition to requested data corresponding to an access request, and store it in the buffer memory, in particular, the cache hit rate with respect to read commands can be increased by holding requested data in the buffer memory when a repeat access request is generated. Therefore, with respect to access requests from the host system, which include both sequential and repeat access requests, the probability of transferring requested data from the buffer memory can be increased. As a result, high-speed data access can be realized.

In addition, according to the system of the present invention, since the CPU 4 can arbitrarily set the amount of data read from the disk and stored in the buffer memory by operating the limit register and the flag register, the specifications for the management of the buffer memory and data transfer control can be flexibly changed.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

I claim:

1. A system for controlling data transfer between a disk drive and a host system, comprising:
 (A) buffer memory means for (A1) storing data read from a disk of the disk drive and (A2) outputting data when the data corresponding to a data access request from the host system is transferred to the host system;
 (B) counter means for counting an amount of data read from the disk and stored in the buffer memory means;
 (C) limit register means for holding a limit value which (C1) represents an amount of data stored in the buffer memory means and (C2) determines a timing at which a read operation of data from the disk is stopped;
 (D) status means for selectively designating permission or inhibition of a read limit function of stopping the read operation on the basis of the limit value set in the limit register means, said status means including a register means in which a flag for designating permission or inhibition of the read limit function is set; and
 (E) control means for (E1) storing data read from the disk in the buffer memory means in accordance with the data access request from the host system, (E2) storing consecutive data read from the disk in accordance with an amount of data which can be stored in the buffer memory means, and (E3) transferring the data stored in the buffer memory means to the host system,
 wherein said status means sets the flag for designating inhibition of the read limit function in the register means when the data access request from the host system is neither a repeat access request nor a sequential access request, and
 wherein said status means sets the flag for designating permission of the read limit function in the register means when the data access request from the host system is the repeat access request, and
 wherein said control means performs the read limit function in accordance with the repeat access request from the host system, when the limit value is set in the limit register means and a count value of the counter means coincides with the limit value, and
 wherein said control means disables the read limit function when the flag for designating inhibition of the read limit function is set in the register means by the status means.

2. A system for controlling data transfer between a disk drive and a host system, comprising:
 (A) buffer memory means for (A1) storing data read from a disk of the disk drive and (A2) outputting data when the data corresponding to a data access request from the host system is transferred to the host system;
 (B) counter means for counting an amount of data read from the disk and stored in the buffer memory means;
 (C) limit register means for holding a limit value which (C1) represents an amount of data stored in the buffer memory means and (C2) determines a timing at which a read operation of data from the disk is stopped;
 (D) status means for selectively designating permission or inhibition of a read limit function of stopping the read operation on the basis of the limit value set in the limit register means, said status means including a register means in which a flag for designating to permit or inhibit the read limit function is set, and
 (E) control means for (E1) storing data read from the disk in the buffer memory means in accordance with the data access request from the host system, (E2) storing consecutive data read from the disk in accordance with an amount of data which can be stored in the buffer memory means, and (E3) transferring the data stored in the buffer memory means to the host system,
 wherein said status means sets the flag for designating inhibition of the read limit function in the register means when the data access request from the host system is neither a repeat access request nor a sequential access request, and
 wherein said status means sets the flag for designating inhibition of the read limit function in the register means when the data access request from the host system is the sequential access request, and
 wherein said control means performs the read limit function when the limit value is set in the limit register means and a count value of the counter means coincides with the limit value, and
 wherein said control means disables the read limit function when the flag for designating inhibition of the read limit function is set in the register means by the status means, and
 wherein said control means restarts a read operation which has been stopped on the basis of the limit value set in the limit register means.

3. A method of controlling data transfer between a disk and a buffer memory in a disk drive and between the buffer memory and a host system, the method comprising the steps of:
 when a data access request from the host system is neither a repeat access request nor a sequential access request, transferring the data stored in the buffer memory to the host system, or storing data read from the disk in the buffer memory and storing consecutive data read from the disk in accordance with an amount of data which can be stored in the buffer memory;
 when a data access request from the host system is neither a repeat access request nor a sequential access request, setting a flag for designating inhibition of a read limit function of stopping a read operation of data from the disk on the basis of a limit value in a register means, the limit value representing an amount of data stored in the buffer memory and determining a timing at which the read operation is stopped;
 when the data access request from the host systems is a repeat access request, setting the limit value and maintaining a count value of an amount of data read from the disk and stored in the buffer memory;
 performing the read limit function in accordance with the repeat access request from the host system when the count value coincides with the limit value; and
 disabling the read limit function when the flag for designating inhibition of the read limit function is set in the register means.

4. A method of controlling data transfer between a disk and a buffer memory in a disk drive and between the buffer memory and a host system, the method comprising the steps of:
 when a data access request from the host system is neither a repeat access request nor a sequential access request, transferring the data stored in the buffer memory to the host system, or storing data read from the disk in the buffer memory and storing consecutive data read from the disk in accordance with an amount of data which can be stored in the buffer memory;

when a data access request from the host system is neither a repeat access request nor a sequential access request, setting a flag for designating inhibition of a read limit function of stopping a read operation of data from the disk on the basis of a limit value in a register means, the limit value representing an amount of data stored in the buffer memory and determining a timing at which the read operation is stopped;

when the data access request from the host system is a repeat access request, setting the limit value and maintaining a count value of an amount of data read from the disk and stored in the buffer memory;

when the data access request from the host system is the sequential access request, setting the flag for designating inhibition of the read limit function in the register means;

performing the read limit function when the count value coincides with the limit value;

disabling the read limit function when the flag for designating inhibition of the read limit function is set in the register means; and restarting the read operation which has been stopped on the basis of the limit value.

* * * * *